Figure 1:
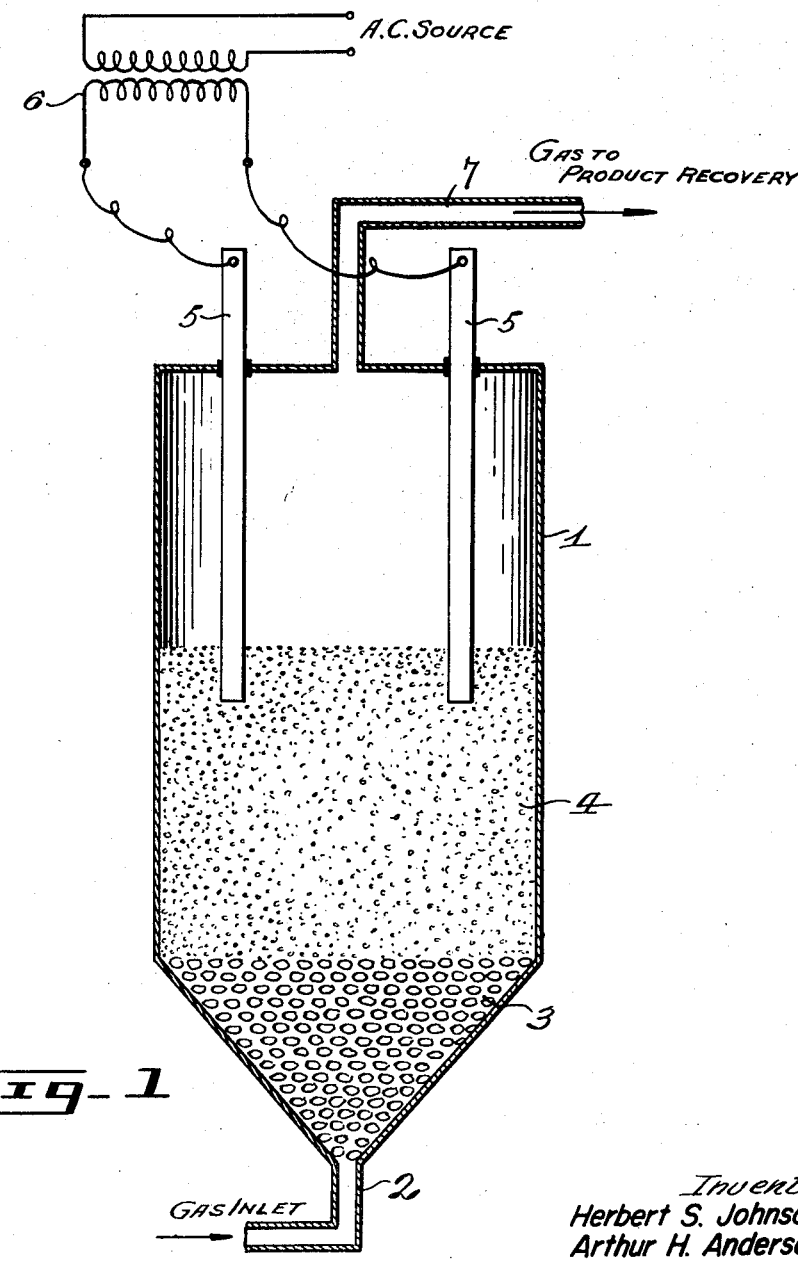

Inventor
Herbert S. Johnson
Arthur H. Andersen
By D.R. Morrison
Agent

Inventor
Herbert S. Johnson
Arthur H. Andersen

United States Patent Office 2,948,587
Patented Aug. 9, 1960

2,948,587

PROCESS FOR THE PREPARATION OF TITANIUM TETRACHLORIDE

Herbert S. Johnson and Arthur H. Andersen, Shawinigan Falls, Quebec, Canada, assignors to Shawinigan Chemicals Limited, Montreal, Quebec, Canada, a corporation of Canada Filed Feb. 28, 1956, Ser. No. 568,325

1 Claim. (Cl. 23—87)

This invention relates to a method for the chlorination of a mixture of titania-bearing material and carbon at elevated temperature to form titanium tetrachloride which can be recovered in any suitable manner from the gases coming off the reaction zone.

Already there are several descriptions of processes for chlorinating titania-bearing material in the presence of carbon in fluidized beds; it has been indicated that, although the reaction is exothermic to a degree, it is sometimes necessary to add heat to the reaction to maintain the necessary temperature of reaction, making up for radiation heat losses, sensible heat losses in products, etc. The necessary heat can readily and conveniently be added to the fluidized bed reaction as required by passing an electric current of appropriate power through the fluidized bed, according to this invention.

It is necessary for at least some of the solids in a bed of fluidized solids to have good conductivity in order to carry sufficient current through the bed to supply the required heat at convenient voltages. An example of a solid material that can be particularly suitable to provide electrical conductivity in a fluidized bed is carbon in some of its numerous forms. It is well known that coke is electrically conductive, and petroleum coke by-product of fluidized bed petroleum cracking processes is in particulate form readily suitable for use in other fluidized bed processes. As produced in fluidized bed petroleum cracking processes, petroleum coke has a very high resistivity (of the order of 500 megohms between two parallel ¼ inch graphite electrodes immersed to a depth of 1 inch and spaced ½ inch apart in a stationary bed of the coke), but on simple calcination at elevated temperature the resistivity, measured as above, decreases greatly (e.g. to about 10 ohms) and the calcined coke has ample conductivity to carry electrical current through a fluidized bed thereof at convenient voltages. Metallurgical coke, in suitable particle size, is also an effective electrical conductor in a fluidized bed. Stoker coke, as made on a chain grate type of continuous stoker, and of appropriate particle size, is another effective electrical conductor in a fluidized bed. Silicon carbide may also be used as an electrical conductor in fluidized beds. For numerous reasons, including its ready availability, calcined fluid petroleum coke is generally preferred in the application of this invention.

The range of conductivity which the solids in a fluidized bed can have, while remaining suitable for the practice of this invention, is not critical, but is important nonetheless. Obviously if the conductivity is too high there might not be enough resistance in a fluidized bed to control the current conveniently and there might be danger of a "dead short" through the bed; however, this possibility is remote with most of the materials ordinarily used in fluidized bed reactions. If the conductivity of a fluidized bed is too low, then in order to supply the power required to maintain the bed temperature, the required voltage may be sufficient to cause open arcs (i.e. continuous arcs) between the electrodes. Open arcs involve a breakdown in the gas and the formation of ions creating a conductive path through the gas. Open arcs are objectionable in the process of this invention in that they make it difficult to regulate the heating current, and they disturb and upset the smooth operation of a fluidized bed by causing momentary local overheating. Hence it is preferred to operate this invention with fluidized beds having sufficient electrical conductivity to prevent the formation of open arcs under the voltage applied to the beds.

Heat can be supplied to a fluidized bed of particulate solids by the passage of either direct or alternating current electricity according to this invention. However, since alternating current is easier to transform and regulate, it is preferred to use alternating current in processes utilizing this invention.

Electric current can be introduced to a fluidized bed of particulate solids for passage therethrough, according to this invention, by a variety of simple means. For example a plurality of electrodes, conveniently made of carbon, with suitable leads to bring the current thereto, can be inserted into a fluidized bed of particulate solids in convenient spaced relationship and voltage applied to the electrodes. Electric current flows between the electrodes and generates heat by passing through the fluidized bed between the electrodes. The heat generated in the zone between the electrodes, through which the current flows, is distributed substantially evenly throughout the fluidized bed by the normal random motion distributing action of the fluidized solids.

Electric current can also be introduced to a fluidized bed of particulate solids by inserting a single electrode at the central axis of the fluidized bed and applying a voltage between the electrode and the walls of the container holding the fluidized bed, thereby forcing electric current from the central electrode through the fluidized bed to the walls of the container and utilizing the walls as a second electrode to complete the electric circuit.

Figure 2:
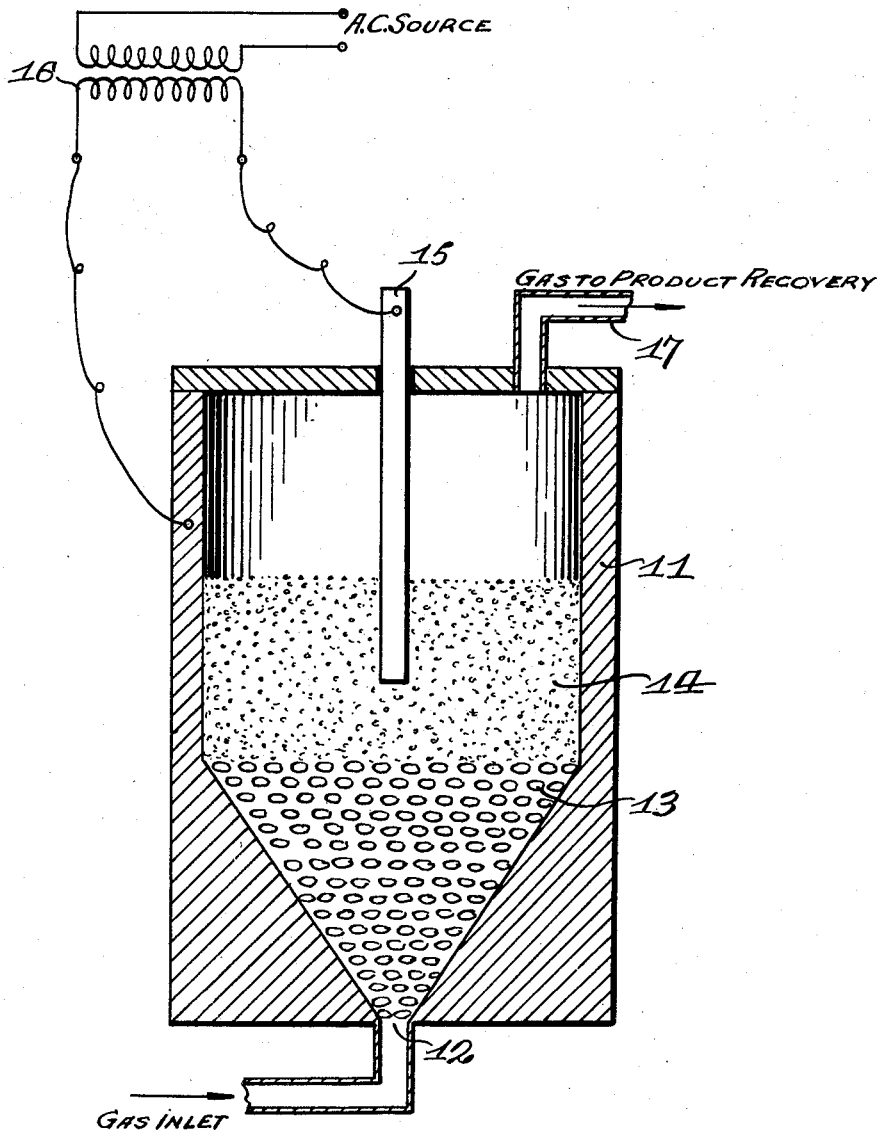

The accompanying drawings illustrate, diagrammatically, different kinds of apparatus which can be used to carry out the invention. Figure 1 shows a chamber 1, designed to contain a bed of fluidized solids at high temperature. Gas to fluidize the solids enters the chamber at 2. Means to distribute the gas over the cross-section of the chamber is shown in the form of a bed of coarse inert particles 3. The finely divided solids forming the fluidized bed are shown at 4. Electrodes 5 are partially immersed in the fluidized bed. Alternating current is supplied to the electrodes by transformer 6. Gases coming off the fluidized bed leave the chamber through outlet 7. Three suitably spaced electrodes in the chamber can draw three phase current from a three phase transformer. Figure 2 shows a cylindrical chamber 11 designed to contain a bed of fluidized solids at high temperature and to act as an electrode for passage of an electric current into the fluidized solids. Gas to fluidize the solids enters the chamber at 12. A bed of coarse inert particles 13 distributes the gas to the fluidized bed of finely divided solids 14. An electrode 15 is positioned centrally in the chamber 11. Voltage is applied between the electrode and the chamber by transformer 16. Gases are removed from the chamber through outlet 17 for product recovery.

It will be observed in practising this invention that a gaseous volumetric flow rate high enough to produce fluidization of particulate solids in a bed at ordinary room temperatures is more than enough to maintain fluidization in the bed at the highly elevated temperatures which can be achieved on passing on electric current through the bed, since the volume of the gases is greatly expanded by heating in the bed at elevated temperatures. Hence a volumetric flow rate of gas, initially at ordinary temperature, sufficient to maintain fluidized conditions of particulate solids in a bed heated according to this invention is considerably smaller than the volumetric flow rate which may be required to initiate fluidization in the bed before heating is started. Conveniently a high initial flow rate used to start fluidization in a bed of particulate solids can be reduced to a suitable lower operating flow rate when the bed has been heated by the passage of electricity therethrough.

The following example is given to illustrate, but not to limit, the scope of the invention.

To carry out this example, a small laboratory reactor was made from high temperature resistant "Vycor" glass. This reactor was generally cylindrical in shape, with a roughly conical bottom. It was 1½ inches in diameter and about 5½ inches long. An inlet at the bottom of the reactor was provided, through which gas could be passed upwardly through the reactor. In the top there were located an outlet tube to conduct gases from the reactor to a recovery system, and two openings for the insertion of electrodes to the reactor.

A sample of petroleum coke, by-product of a fluidized bed petroleum cracking process, was calcined and the calcined coke screened on a No. 14 standard sieve screen having 1.41 mm. openings. The coarse particles retained on the screen were all less than about ¼ inch diameter. The bottom part of the reactor, for a height of about 2 inches, was filled with the coarse coke fraction. On top of this was placed a layer of about 1½ inches of the fine particle fraction of the screened coke. Two ¼ inch diameter graphite electrodes were inserted through the top of the reactor and into the bed of fine coke to a depth of about 1 inch, leaving a minimum distance of about one half inch between the electrodes and the coarse coke particles. The electrodes were inserted vertically, spaced about ¾ inch apart, and their depth of immersion in the coke could be adjusted. The tops of the electrodes were connected in series with an ammeter and the output of a variable voltage autotransformer having a continuous range of 0 to 300 volts output with 9 amperes maximum current capacity from a 220 volt alternating current supply. A voltmeter was also connected across the electrodes to permit reading of the voltage applied to the electrodes.

The bed of fine calcined fluid petroleum coke particles was fluidized in a stream of chlorine gas, and a current passed through the fluidized bed to heat it to a red heat. A quantity of ground titania-bearing slag, having particles about the same size as the coke particles, was added to the fluidized bed, and the gases coming off the fluidized bed were passed through a condenser. From the condenser there was recovered a quantity of liquid titanium tetrachloride, indicating satisfactory reaction between the reactants chlorine, carbon and titania.

It can be pointed out that in the foregoing example, and in any other application of this invention, it is possible and sometimes desirable to operate a fluidized bed of fine particulate solids at a low gas flow rate which does not fluidize all the fine solid particles which are available to form the fluidized bed but which leaves a layer of stationary fine particles at rest beneath the fluidized particles. Operating in this manner, with only a fraction of the total available solids in a fluidized state and conducting current, there is a smaller current flow and a consequent smaller consumption of power. When increased power consumption and/or a deeper fluidized bed is desired with such arrangement, both the power and depth factors can be increased by increasing the gas flow rate to fluidize some of the fine solids formerly at rest beneath the fluidized portion of the fine solids, and adjusting the means supplying current to the bed to increase the power input as desired.

What is claimed is:

A process for preparing titanium tetrachloride which comprises passing a stream of chlorine gas upwardly through a bed of finely divided electrically conductive solid carbon particles of calcined fluid petroleum coke having sufficient electrical conductivity to prevent the formation of open arcs when an electric current is passed through the same, maintaining the solid particles in a fluidized state by the passage of said stream of chlorine gas upwardly therethrough, passing an electric current through the fluidized bed without the formation of open arcs and with sufficient power to maintain it at an elevated temperature of at least about red heat for the formation of titanium tetrachloride when titania-bearing material is added to the thus fluidized bed, adding titania-bearing material to the fluidized bed so formed in a particle size of about the same size as the coke particles with the latter at red heat and recovering titanium tetrachloride from the gases coming off the fluidized bed.

References Cited in the file of this patent

UNITED STATES PATENTS

| | | |
|---|---|---|
| 1,549,812 | Siedler | Aug. 18, 1925 |
| 1,857,799 | Winkler | May 10, 1932 |
| 2,184,885 | Muskat et al. | Dec. 26, 1939 |
| 2,398,443 | Munday | Apr. 16, 1946 |
| 2,462,661 | Munday | Feb. 22, 1949 |
| 2,475,607 | Garbo | July 12, 1949 |
| 2,589,466 | Wilcox | Mar. 18, 1952 |
| 2,698,777 | Hartwick | Jan. 4, 1955 |
| 2,701,179 | McKinney | Feb. 1, 1955 |
| 2,799,640 | Pevere et al. | July 16, 1957 |

OTHER REFERENCES

Chem. Eng. Progress, November 1954, pages 578, 579.

Fluidized Solids, Chem. Eng., May 1953, pages 219–231.